(12) United States Patent
Teng

(10) Patent No.: US 7,699,484 B2
(45) Date of Patent: Apr. 20, 2010

(54) DIRECT-TYPE BACKLIGHT MODULE HAVING FIXING MEMBER AND ELASTIC MEMBERS COOPERATIVELY FIXING LIGHT SOURCES

(75) Inventor: Hsuan-Yu Teng, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 0 days.

(21) Appl. No.: 12/157,018

(22) Filed: Jun. 6, 2008

(65) Prior Publication Data

US 2008/0304259 A1    Dec. 11, 2008

(30) Foreign Application Priority Data

Jun. 8, 2007    (TW) ............................... 96209466 U

(51) Int. Cl.
*G09F 13/04*    (2006.01)

(52) U.S. Cl. .................. 362/97.3; 362/217.12; 362/288

(58) Field of Classification Search ................ 362/97.1, 362/97.2, 97.3, 97.4, 217.11, 217.12, 217.13, 362/217.15, 217.16, 217.17, 225, 288, 396, 362/632, 633, 634
See application file for complete search history.

(56) References Cited

U.S. PATENT DOCUMENTS

| | | | |
|---|---|---|---|
| 7,273,291 B2 | 9/2007 | Kim et al. | |
| 7,324,174 B2* | 1/2008 | Hafuka et al. | 362/97.1 |
| 2006/0279946 A1* | 12/2006 | Park et al. | 362/97 |
| 2007/0121344 A1* | 5/2007 | Chang | 362/632 |
| 2007/0127272 A1* | 6/2007 | Yang | 362/634 |

* cited by examiner

*Primary Examiner*—Y My Quach Lee
(74) *Attorney, Agent, or Firm*—Wei Te Chung

(57) ABSTRACT

An exemplary direct-type backlight module includes light sources, a frame, and a fixing member. Each light source includes a supporting strip and at least one light-emitting member provided with the supporting strip. The frame includes a bottom plate. The bottom plate includes elastic members. The fixing member is engaged with the elastic members thereby fixing the supporting strips of the light sources to the bottom plate of the frame. A liquid crystal display using the backlight module is also provided.

20 Claims, 4 Drawing Sheets

DIRECT-TYPE BACKLIGHT MODULE HAVING FIXING MEMBER AND ELASTIC MEMBERS COOPERATIVELY FIXING LIGHT SOURCES

BACKGROUND

1. Field of the Invention

The present invention relates to a direct-type backlight module including a fixing element and a plurality of elastic elements which cooperatively fix a plurality of light sources to a frame, and to a liquid crystal display using the backlight module.

2. General Background

Liquid crystal displays are commonly used as display devices for compact electronic apparatuses, not only because they provide good quality images but also because they are very thin. The liquid crystal in a liquid crystal display does not emit any light itself. The liquid crystal requires a light source so as to be able to clearly and sharply display text and images. Therefore, a typical liquid crystal display requires an accompanying backlight module. Generally, backlight modules include side-edge backlight modules and direct-type backlight modules.

Referring to FIG. 6, a typical liquid crystal display 1 includes a liquid crystal panel 19, and a direct-type backlight module 10 below the liquid crystal panel 19.

The backlight module 10 includes a frame 15, a plurality of light sources 14, a diffusing plate 12, and a brightness enhancement film (BEF) 11. Each light source 14 includes a supporting strip 141 and a plurality of light-emitting elements 142. The supporting strip 141 includes a circuit (not shown) formed thereon. The light-emitting elements 142 are mounted on the supporting strip 141 in a line. An external power source provides power to the light-emitting elements 142 via wires (not shown) and the circuit. The frame 15 includes a substantially rectangular bottom plate 151, and four side plates 150 upwardly extending from edges of the bottom plate 151. The bottom plate 151 and the side plates 150 cooperatively define an accommodating space. The light sources 14, the diffusing plate 12, and the BEF 11 are accommodated in the accommodating space of the frame 15, in that order from bottom to top. The light sources 14 are mounted on the bottom plate 151 of the frame 15 through screws or double-sided strips of adhesive tape.

In assembly of the backlight module 10, the light sources 14 need to be fixed or stuck to the bottom plate 151 by hand. In the case of a large-sized liquid crystal display 1, many light sources 14 are required. For such kinds of liquid crystal displays 1 in particular, the operation of attaching the light sources 14 is complicated and time consuming.

Therefore, a new direct-type backlight module that can overcome the above-described problems is desired. What is also desired is a liquid crystal display using such backlight module.

SUMMARY

In one preferred embodiment, a direct-type backlight module includes a plurality of light sources, a frame, and a fixing member. Each light source includes a supporting strip and at least one light-emitting member provided with the supporting strip. The frame includes a bottom plate. The bottom plate includes a plurality of elastic members. The fixing member is engaged with the elastic members thereby removably fixing the supporting strips of the light sources to the bottom plate of the frame.

Other novel features and advantages will become more apparent from the following detailed description when taken in conjunction with the accompanying drawings.

DETAILED DESCRIPTION OF PREFERRED EMBODIMENTS

Figure 1:
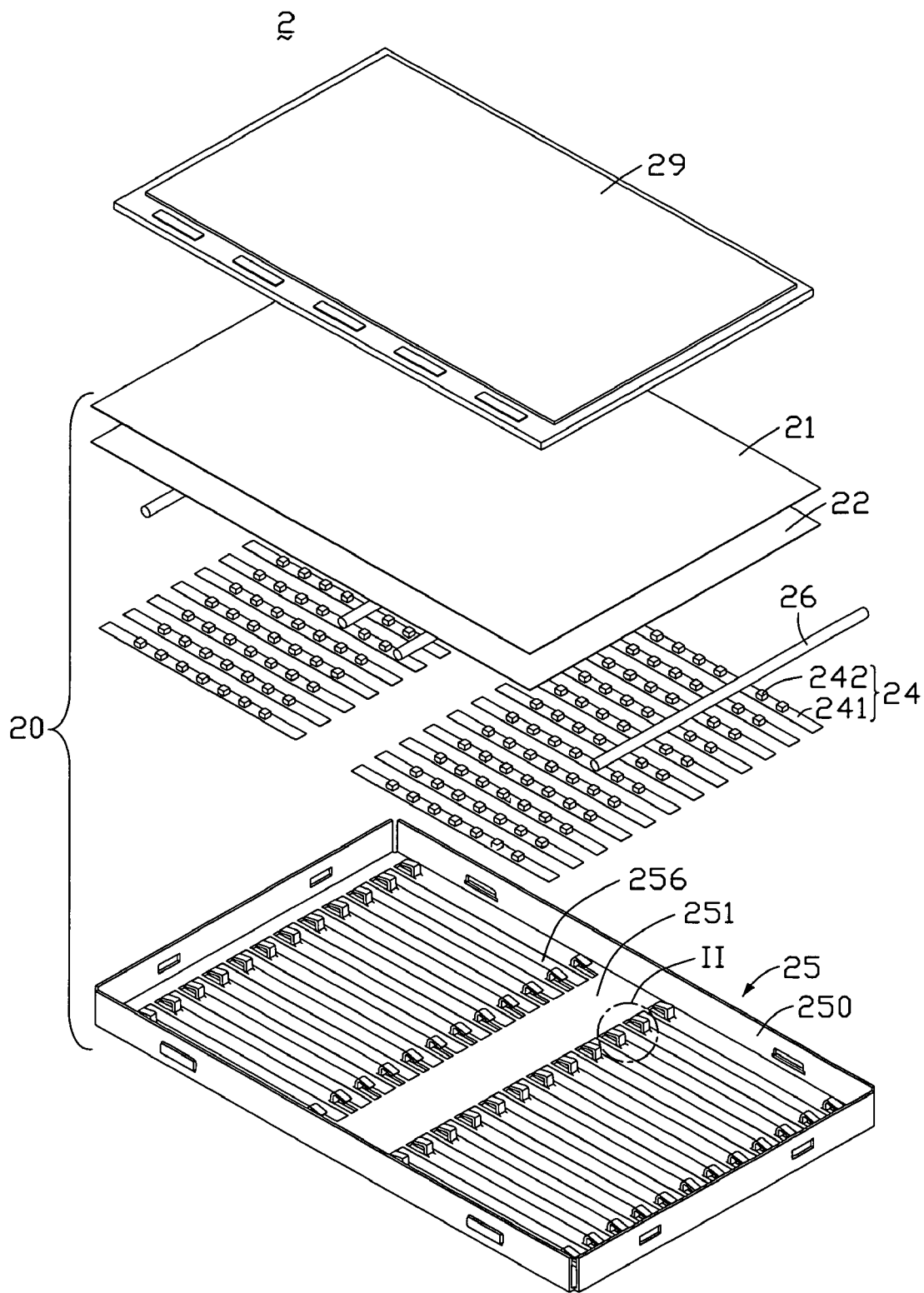
FIG. 1 is an exploded, isometric view of a liquid crystal display according to a first embodiment of the present invention, the liquid crystal display including a direct-type backlight module, the backlight module including a plurality of light sources and a frame.

Referring to FIG. 1, a liquid crystal display 2 according to a first embodiment of the present invention is shown. The liquid crystal display 2 includes a liquid crystal panel 29, and a direct-type backlight module 20 below the liquid crystal panel 29. The backlight module 20 is configured to provide planar light for the liquid crystal panel 29.

The backlight module 20 includes a frame 25, a plurality of light sources 24, four fixing elements 26, a diffusing plate 22, and a BEF 21. The light sources 24, the diffusing plate 22, and the BEF 21 are arranged in the frame 25, in that order from bottom to top.

Each light source 24 includes a supporting strip 241 and a plurality of light-emitting elements 242. The supporting strip 241 includes a circuit (not shown) formed thereon. The light-emitting elements 242 are mounted on the supporting strip 241 in a line. An external power source provides power to the light-emitting elements 242 via wires (not shown) and the circuit. Light emitted from the light-emitting elements 242 transmits through the diffusing plate 22 and the BEF 21 to illuminate the liquid crystal panel 29. The light-emitting elements 242 can for example be light-emitting diodes (LEDs).

The frame 25 includes a rectangular bottom plate 251, and four side plates 250 upwardly extending from edges of the bottom plate 251. The bottom plate 251 and the side plates 250 cooperatively define an accommodating space, which space accommodates the light sources 24, the diffusing plate 22, and the BEF 21 therein. A plurality of elongated recesses 256 are formed in the bottom plate 251 of the frame 25. The recesses 256 are arranged in a matrix pattern, which includes a plurality of rows and two columns. The light sources 24 are received in the recesses 256 respectively. The bottom plate 251 further includes a plurality of strip-shaped portions between the recesses 256. A depth of the recesses 256 is less than a thickness of the supporting strips 241 of the light sources 24. A pair of elastic elements 252 are formed at opposite ends of each strip-shaped portion, respectively. A pair of elastic elements 252 are also formed at the top of each column of the matrix, and at the bottom of each column of the matrix. That is, there are two elastic elements 252 between every two adjacent recesses 256, two elastic elements 252 adjacent a top of the topmost strip-shaped portion of each column, and two elastic elements 252 adjacent a bottom of a bottommost strip-shaped portion of each column. Each two elastic elements 252 between every two adjacent recesses 256 are adjacent to two end portions of each of the two adjacent recesses 256, respectively.

Figure 2:
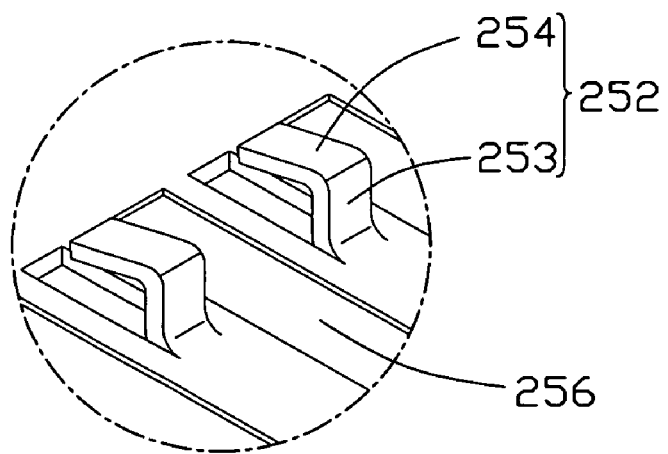
FIG. 2 is an enlarged view of a circled portion II of FIG. 1.

Referring also to FIG. 2, the elastic elements 252 are inseparably integrated with the bottom plate 251 of the frame 25. That is, the frame 25 including the elastic elements 252 is of a single body of material. In the illustrated embodiment, the elastic elements 252 are stamped from the bottom plate 251, with each elastic element 252 being generally L-shaped. In particular, each elastic element 252 includes a bending portion 253 and an extending portion 254. The bending portion 253 extends substantially upwardly from the bottom plate 251. The extending portion 254 extends approximately perpendicularly from the bending portion 253. In particular, the extending portion 254 extends slightly down, such that an angle between the bending portion 253 and the extending portion 254 is approximately 90 degrees or less.

In the illustrated embodiment, the fixing elements 26 are four long cylindrical bars, each of which has a circular cross-section. Two of the fixing elements 26 are positioned at two sides of one of the columns of the matrix, respectively. The other two fixing elements 26 are positioned at two sides of the other column of the matrix, respectively. Each fixing element is elastically held in position below the extending portions 254 of the corresponding elastic elements 252. Thus, the light sources 24 can be fixedly mounted in the recesses 256 of the bottom plate 251 of the frame 25 by means of the fixing elements 26, which are elastically maintained in position by the elastic elements 252.

Figure 3:
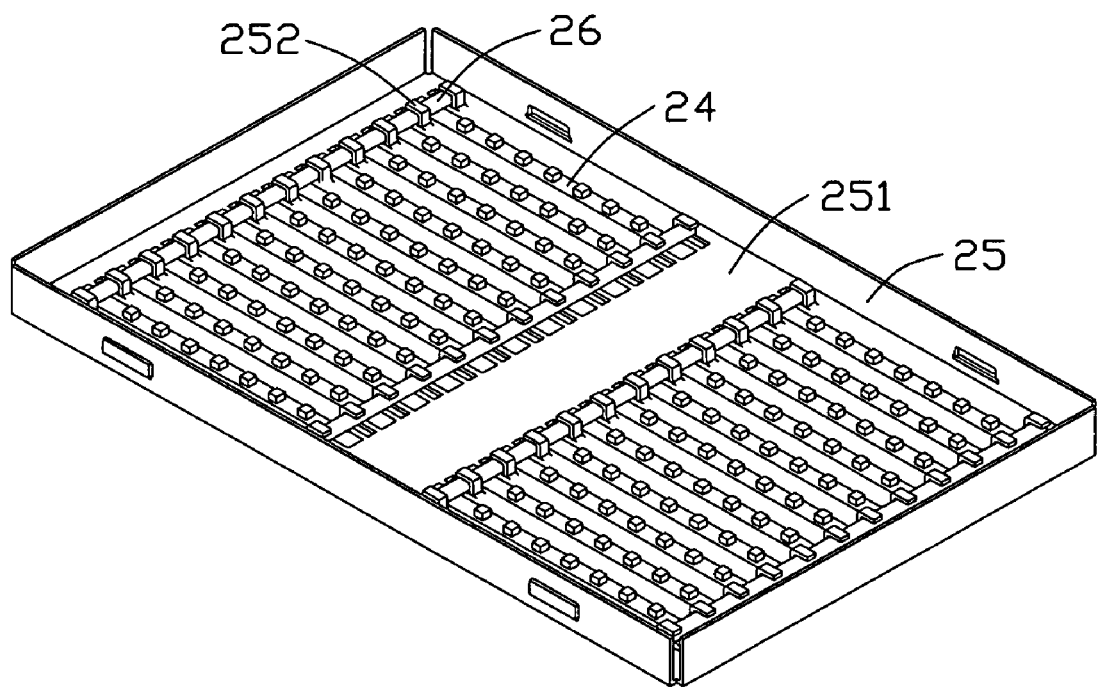
FIG. 3 is an isometric view showing the light sources attached in the frame of FIG. 1.

Referring also to FIG. 3, in assembly of the backlight module 20, the light sources 24 are mounted to the bottom plate 251 of the frame 25. First, the light sources 24 are placed in the recesses 256 of the bottom plate 251. Then, each of the fixing elements 26 is inserted between a corresponding column of elastic elements 252 and the bottom plate 251. The elastic elements 252 resiliently exert downward force on the fixing elements 26 such that the fixing elements 26 downwardly press the supporting strips 241 of the light sources 24. Thus, the light sources 24 are fixedly mounted to the bottom plate 251 of the frame 25.

In summary, the backlight module 20 of the liquid crystal display 2 includes the elastic elements 252 and the fixing elements 26 which cooperatively fix the light sources 24 to the frame 25. No matter how many light sources 24 are used, the assembly and disassembly of the backlight module 20 and the liquid crystal display 2 are simplified.

Figure 4:
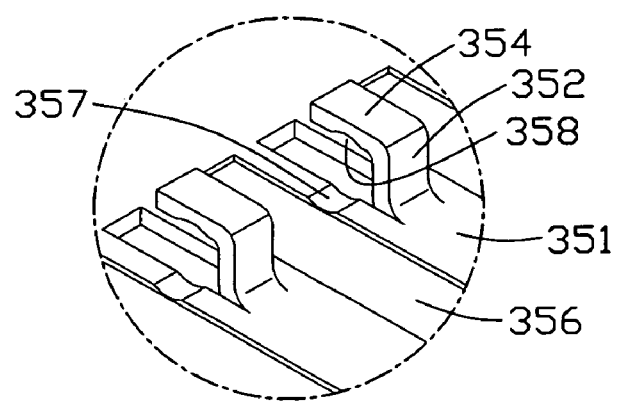
FIG. 4 is similar to FIG. 2, but showing a corresponding view in the case of a liquid crystal display according to a second embodiment of the present invention.

Referring to FIG. 4, a liquid crystal display according to a second embodiment of the present invention is similar to the liquid crystal display 2 of the first embodiment. However, in the second embodiment, a bottom plate 351 includes a plurality of strip-shaped portions between a plurality of recesses 356. The bottom plate 351 further includes a plurality of pairs of first notches 357, with each pair of first notches 357 located below a respective elastic element 352. An extending portion 354 of each elastic element 352 includes a second notch 358 defined at a lower surface (not labeled) thereof. The first and second notches 357, 358 cooperatively accommodate the fixing elements 36. That is, the fixing elements 36 are snappingly received between the extending portions 354 of the elastic elements 352 and the strip-shaped portions of the bottom plate 351. In the illustrated embodiment, each of the first and second notches 357, 358 defines an arc-shaped profile. The arc-shaped profiles of each pair of first and second notches 357, 358 are located approximately along the periphery of a same imaginary circular cylinder.

Figure 5:
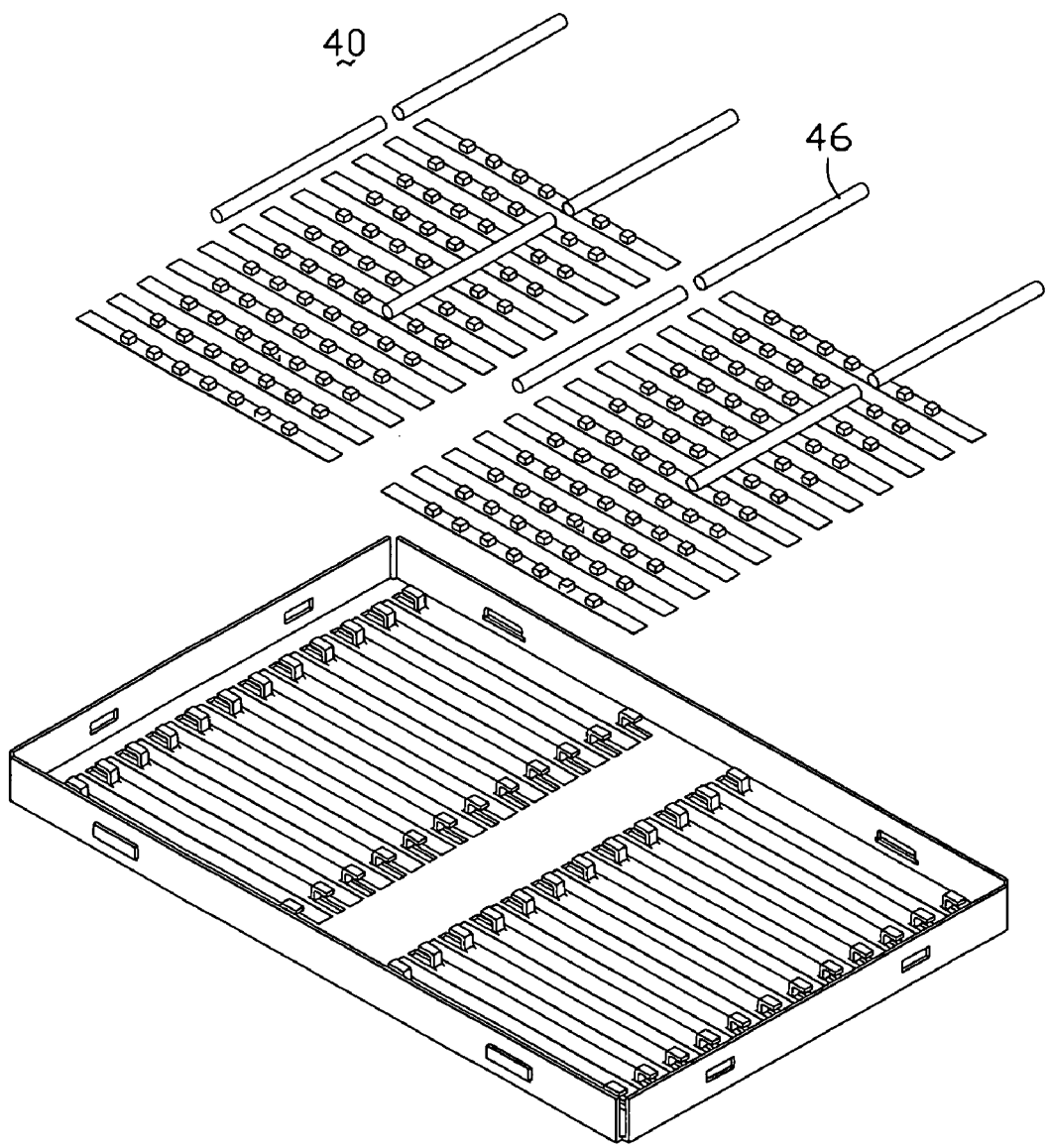
FIG. 5 is an exploded, isometric view of certain parts of a direct-type backlight module of a liquid crystal display according to a third embodiment of the present invention.
Figure 6:
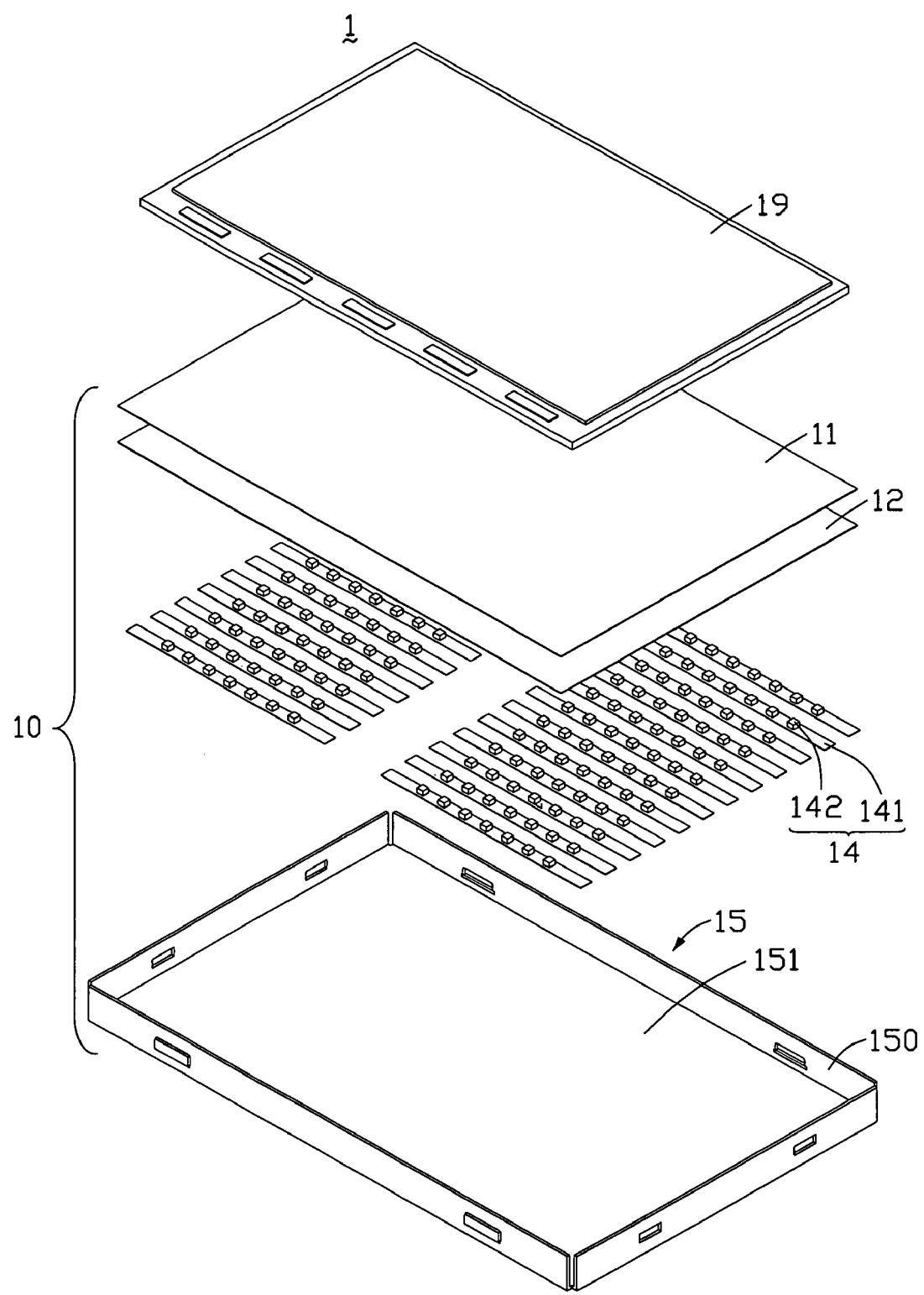
FIG. 6 is an exploded, isometric view of a conventional liquid crystal display.

Referring to FIG. 5, a direct-type backlight module 40 of a liquid crystal display according to a third embodiment of the present invention is similar to the backlight module 20 of the first embodiment. However, the direct-type backlight module 40 includes eight fixing elements 46. Each column of light sources is fixed by four of the fixing elements 46.

Further or alternative embodiments may include the following. In a first example, the recesses 26 can be arranged in other patterns. For example, a matrix pattern may include a plurality of rows and three columns. In a second example, the elastic elements 252 can be independent (discretely formed) elements, which are mounted to the bottom plate 251 of the frame 25. In a third example, the fixing elements 26 can have other shapes, such as a bar shape with an elliptical cross-section.

It is to be further understood that even though numerous characteristics and advantages of the present embodiments have been set out in the foregoing description, together with details of the structures and functions of the embodiments, the disclosure is illustrative only; and that changes may be made in detail, especially in matters of shape, size and arrangement of parts within the principles of the invention to the full extent indicated by the broad general meaning of the terms in which the appended claims are expressed.

What is claimed is:

1. A direct-type backlight module comprising:
   a plurality of light sources, each light source comprising a supporting strip and at least one light-emitting member provided with the supporting strip;
   a frame comprising a bottom plate, the bottom plate comprising a plurality of elastic members and a plurality of recesses, the light sources received in the recesses respectively, a thickness of each of the supporting strips of the light sources being greater than a depth of each of the recesses; and
   a fixing member, the fixing member being engaged with the elastic members thereby removably fixing the supporting strips of the light sources to the bottom plate of the frame.

2. The direct-type backlight module in claim 1, wherein the light-emitting members are light-emitting diodes.

3. The direct-type backlight module in claim 1, wherein the recesses are arranged in a matrix pattern, the matrix pattern comprising two columns and a plurality of rows.

4. The direct-type backlight module in claim 3, wherein each elastic member among a plurality of the elastic members is located between two corresponding adjacent recesses.

5. The direct-type backlight module in claim 1, wherein each elastic member comprises a bending portion extending from the bottom plate and an extending portion extending from the bending portion, an angle between the bending portion and the extending portion being approximately equal to or less than 90 degrees.

6. The direct-type backlight module in claim 5, wherein the fixing member is elastically held in position between the extending portions of the elastic members and the supporting strips of the light sources.

7. The direct-type backlight module in claim 6, wherein each extending portion comprises a notch defined therein, the notch accommodating part of the fixing member.

8. The direct-type backlight module in claim 1, wherein the fixing member is a bar.

9. A direct-type backlight module comprising:
   a plurality of light sources, each light source comprising a supporting strip and at least one light-emitting member provided with the supporting strip;

a frame comprising a bottom plate, the bottom plate comprising a plurality of elastic members and a plurality of recesses, the recesses arranged in a matrix pattern, the matrix pattern comprising two columns and a plurality of rows, the light sources received in the recesses respectively; and a fixing member, the fixing member being engaged with the elastic members thereby removably fixing the supporting strips of the light sources to the bottom plate of the frame.

10. The direct-type backlight module in claim 9, wherein the light-emitting members are light-emitting diodes.

11. The direct-type backlight module in claim 9, wherein each elastic member among a plurality of the elastic members is located between two corresponding adjacent recesses.

12. The direct-type backlight module in claim 9, wherein each elastic member comprises a bending portion extending from the bottom plate and an extending portion extending from the bending portion, an angle between the bending portion and the extending portion being approximately equal to or less than 90 degrees.

13. The direct-type backlight module in claim 9, wherein a thickness of each of the supporting strips of the light sources is greater than a depth of each of the recesses.

14. The direct-type backlight module in claim 12, wherein the fixing member is elastically held in position between the extending portions of the elastic members and the supporting strips of the light sources.

15. A direct-type backlight module comprising:

a plurality of light sources, each light source comprising a supporting strip and at least one light-emitting member provided with the supporting strip;

a frame comprising a bottom plate, the bottom plate comprising a plurality of elastic members, each elastic member comprising a bending portion extending from the bottom plate and an extending portion extending from the bending portion, an angle between the bending portion and the extending portion being approximately equal to or less than 90 degrees; and a fixing member; the fixing member elastically held in position between the extending portions of the elastic members and the supporting strips of the light sources thereby removably fixing the supporting ships of the light sources to the bottom plate of the frame.

16. The direct-type backlight module in claim 15, wherein the light-emitting members are light-emitting diodes.

17. The direct-type backlight module in claim 15, wherein the bottom plate further comprises a plurality of recesses, the light sources being received in the recesses respectively.

18. The direct-type backlight module in claim 17, wherein the recesses are arranged in a matrix pattern, the matrix pattern comprising two columns and a plurality of rows.

19. The direct-type backlight module in claim 18, wherein each elastic member among a plurality of the elastic members is located between two corresponding adjacent recesses.

20. The direct-type backlight module in claim 17, wherein a thickness of each of the supporting strips of the light sources is greater than a depth of each of the recesses.

* * * * *